P. W. Vail.
Hat Ventilator.
Nº 93,251. Patented Aug. 3, 1869.

Witnesses:
Wm M Gooding
Edward Collier

Inventor:
P W Vail

United States Patent Office.

P. W. VAIL, OF NEWARK, NEW JERSEY.

Letters Patent No. 93,251, dated August 3, 1869.

IMPROVEMENT IN HATS.

The Schedule referred to in these Letters Patent and making part of the same.

*To all whom it may concern:*

Be it known that I, P. W. VAIL, of the city of Newark, in the county of Essex, and State of New Jersey, have made certain improvements in Ventilating-Coverings for the head; and declare the following, taken in connection with the accompanying drawings, to be a concise, correct description thereof.

The nature of my improvement consists in so decreasing the size of the crown just above the contact thereof with the head of the wearer, as to form a narrow shelf, and perforating the same.

As the law requires only sufficient description to enable skilled experts in hat-making to make the same, and forbids prolixity, and any hatter could, from the drawings alone, produce a *fac simile* to the model-hat, I subjoin the following brief description.

Figure 1:
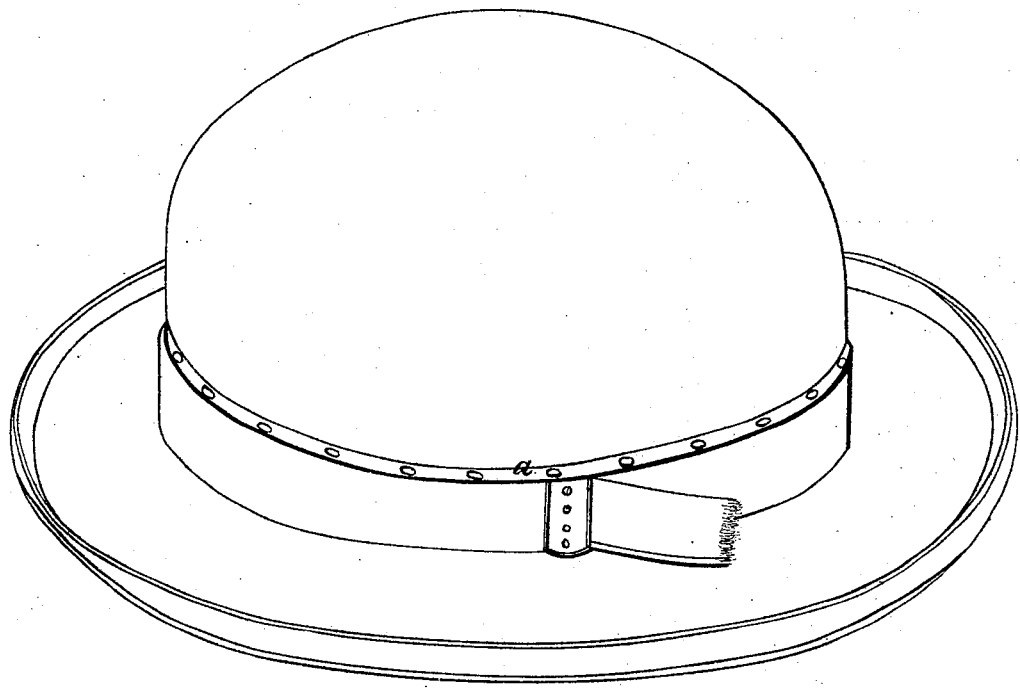
Figure 2:
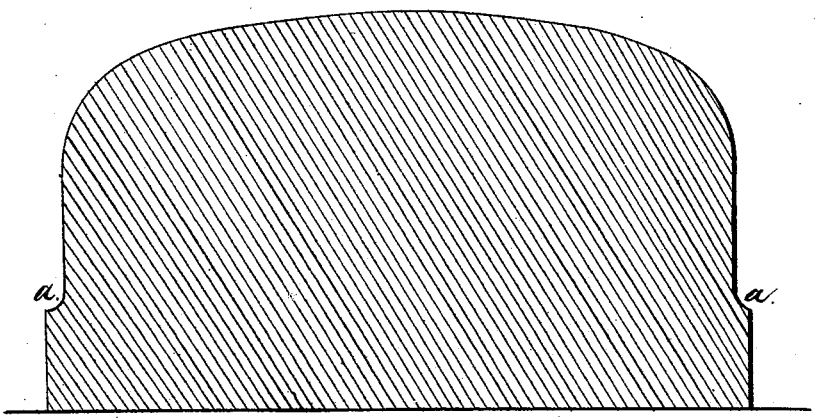

The shape of the hat, of course, is that of the block used, as in section, Figure 2, and the perforations are made in the shelf *a*, on the body, in number and size as may be deemed desirable, and are made with punches commonly in use.

The object being a free circulation of air about the top of the head of the wearer, is deemed to be attained in the best manner of uniting utility, neatness, and elegance in my improvement.

What I claim as my improvement, and desire to secure by Letters Patent, is—

A hat or cap, the crown of which is formed with a shelf or shoulder, *a*, perforated, to admit air, as hereinabove specified and shown.

P. W. VAIL.

Witnesses:
    W. M. GOODING,
    EDWARD COLLYER.